(12) United States Patent
Brown

(10) Patent No.: US 6,810,365 B1
(45) Date of Patent: Oct. 26, 2004

(54) MONITORING WASTE LIQUID TO DETERMINE MEMBRANE CLEANSING PERFORMANCE

(75) Inventor: Stuart H. Brown, Severna Park, MD (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 239 days.

(21) Appl. No.: 10/171,574

(22) Filed: Jun. 13, 2002

(51) Int. Cl.[7] .............................................. B01D 21/32
(52) U.S. Cl. .......................... 702/188; 210/93; 210/97
(58) Field of Search .......................... 702/12, 17, 100, 702/182, 188, 190, FOR 124, FOR 131, 25; 210/93, 94, 96.2, 745, 799

(56) References Cited

U.S. PATENT DOCUMENTS

| | | | | |
|---|---|---|---|---|
| 3,917,945 A | * | 11/1975 | Sema et al. | 250/301 |
| 3,937,580 A | | 2/1976 | Kasdan | |
| 4,724,076 A | * | 2/1988 | Deguchi et al. | 210/360.2 |
| 4,798,677 A | * | 1/1989 | Irwin | 210/799 |
| 5,328,598 A | * | 7/1994 | Lohrl et al. | 210/93 |
| 5,504,573 A | | 4/1996 | Cheiky-Zelina | |
| 5,624,577 A | * | 4/1997 | Wehrle et al. | 210/768 |
| 5,672,873 A | | 9/1997 | Yamazoe | |
| 5,742,064 A | | 4/1998 | Infante | |
| 5,932,091 A | * | 8/1999 | Tompkins et al. | 210/97 |
| 5,959,731 A | | 9/1999 | Jones | |
| 5,980,754 A | * | 11/1999 | Hopkins et al. | 210/703 |
| 6,038,027 A | | 3/2000 | Marcus et al. | |
| 6,067,161 A | | 5/2000 | Marcus et al. | |
| 6,113,800 A | * | 9/2000 | Hopkins et al. | 210/703 |
| 6,137,575 A | | 10/2000 | Sugiyama et al. | |
| 2001/0027954 A1 | * | 10/2001 | Broeders et al. | 210/800 |
| 2002/0063051 A1 | * | 5/2002 | Molintas | 202/177 |
| 2003/0089647 A1 | * | 5/2003 | Tsuihiji et al. | 210/87 |

FOREIGN PATENT DOCUMENTS

| | | | | | |
|---|---|---|---|---|---|
| JP | 01121751 A | * | 5/1989 | .......... | G01N/31/00 |
| JP | 05281140 A | * | 10/1993 | .......... | G01N/21/59 |
| JP | 09029243 A | * | 2/1997 | .......... | C02F/1/32 |
| JP | 2000298053 A | * | 10/2000 | .......... | G01F/23/28 |
| JP | 2001009205 A | * | 1/2001 | .......... | B01D/17/12 |

* cited by examiner

*Primary Examiner*—Marc S. Hoff
*Assistant Examiner*—Carol S. Tsai
(74) *Attorney, Agent, or Firm*—Jacob Shuster

(57) ABSTRACT

The integrity of membranes utilized on-board marine vessels to separate oil from oily waste water is monitored by conducting the cleansed waste water along a predetermined path through an enclosure within which a surface of such waste water during flow is exposed to a confined body of air so as to effect the extent of light absorbed therefrom into the waste water. Sensing the light remaining in the body of air produces signals from which membrane integrity may be determined based on the presence of an oil film on the air exposed waste water surface.

7 Claims, 2 Drawing Sheets

MONITORING WASTE LIQUID TO DETERMINE MEMBRANE CLEANSING PERFORMANCE

The present invention relates generally to monitoring the cleansing of waste liquid, such as oily waste water.

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

Presently, liquid wastes are collected and stored on board ships during transit or while moored in restricted waters for cleansing treatment by membrane separation systems before subsequent waste disposal discharge within a limited period of time, such as 6 hours. Costly waste oil content monitoring systems are currently utilized to check performance of the water cleansing membranes by measuring the concentration of oil in the permeate to be discharged overboard. With respect to low concentrations of oil emulsified in the discharges, such measurements of oil content are not reliable because of various types of contaminants in the permeate, such as air bubbles and solid particles which adversely affect sensor detection involved to obtain the measurements. It is therefore an important object of the present invention to provide for monitoring of the cleansed waste water in such a manner as to more reliably check membrane performance in its oil separation cleansing action.

SUMMARY OF THE INVENTION

In accordance with the present invention, the measurement of low oil content concentrations in oily waste water discharges is avoided in favor of detecting optical properties of atmospheric air to which the surface of oily waste liquid is exposed during flow along a predetermined path through an enclosure within which the air is confined with a certain amount of light energy therein for optical detection of variation in light by a sensor. Thus, the signal data from the sensor will reflect variation in absorption of light by the waste liquid at a surface thereon during said flow, which is affected by the presence of any waste oil film on the waste liquid being monitored. Such signal data may therefore be utilized to more reliably indicate membrane performance integrity.

BRIEF DESCRIPTION OF DRAWING

A more complete appreciation of the invention and many of its attendant advantages will be readily appreciated as the same becomes better understood by reference to the following detailed description when considered in connection with the accompanying drawing wherein.

DETAILED DESCRIPTION OF PREFERRED EMBODIMENT

Figure 1:
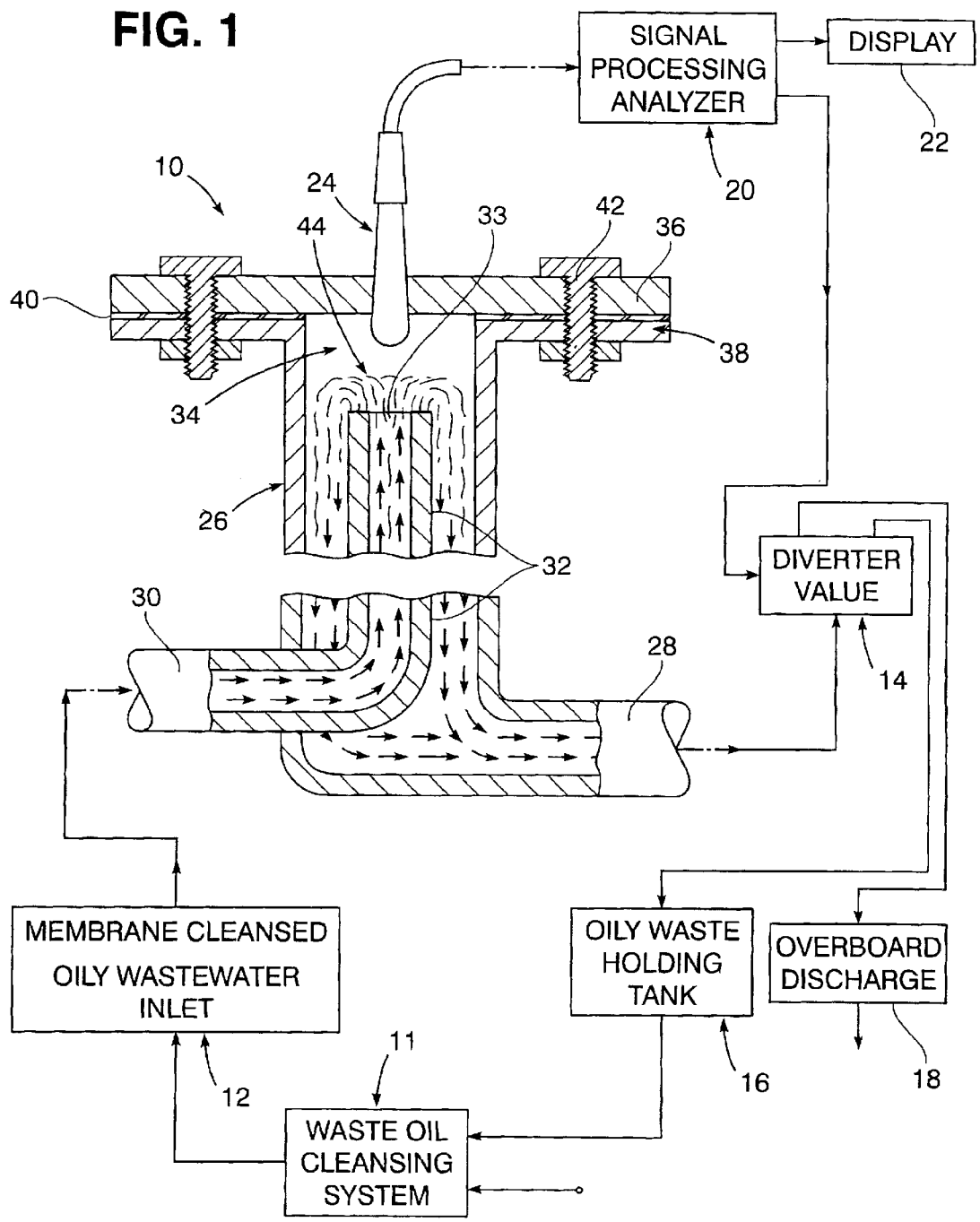
FIG. 1 is a partial section view through a monitoring device diagrammatically shown associated with other components of a waste liquid cleansing system.

Referring now to the drawing in detail, FIG. 1 illustrates shipboard monitoring apparatus in the form of a device 10, arranged pursuant to one embodiment of the present invention in association with other shipboard equipment generally known in the art to provide information on the operational integrity of membranes utilized in an oily waste water cleansing system 11 to cleanse oily waste water collected on board a ship. The cleansed oily waste water is delivered from the membrane type cleansing system 11 through an inlet 12 to the monitoring device 10, from which the cleansed oily waste water may be conveyed to a diverter valve 14 through which unacceptably cleansed waste water is delivered to a holding tank 16 for reprocessing by the cleansing system 11, while the normally cleansed waste water is delivered for overboard discharge 18. Control over such valve 14 is exercised by a signal processing analyzer through which signal information on membrane integrity is obtained and fed to a display 22. Signal input for such analyzer 20 is derived from the monitoring device 10, pursuant to the present invention, through an optical property type probe sensor 24 as hereinafter explained.

With continued reference to FIG. 1, the monitoring device 10 includes a vertically extending tubular enclosure 26 from which a outlet pipe 28 horizontally extends from its lower end to the diverter valve 14. Also extending into the enclosure 26 adjacent its lower end is an inlet pipe 30 through which the cleansed oily waste water is delivered to the monitoring device 10. Such inlet pipe 30 has a vertical inflow tube 32 extending therefrom within the tubular enclosure 26, radially spaced from the enclosure internal wall surface to form an annular downflow passage thereabout to the outlet pipe 28. The upper outlet end 33 of inflow tube 32 opens into an air gap zone 34 formed at the upper end portion of the tubular enclosure 26 below a top flange 36 sealingly connected to a lower flange 38, with gasket 40 therebetween, and a plurality of screw fasteners 42 extending through the flanges and gasket. Thus, the air gap zone confines a body of ambient atmospheric air to which a free surface area 44 on the liquid waste is exposed at the upper open end of the inflow tube 32 during flow along a predetermined path within the enclosure 26. The presence of a waste oil layer or film on the waste liquid exposed to the air within the air gap zone 34, affects the content of the mixture therein and the associated optical properties detected by the sensor 24, projecting into the air gap zone 34 through the top flange 36 of the device 10, to which the sensor 24 is welded.

Figure 2:
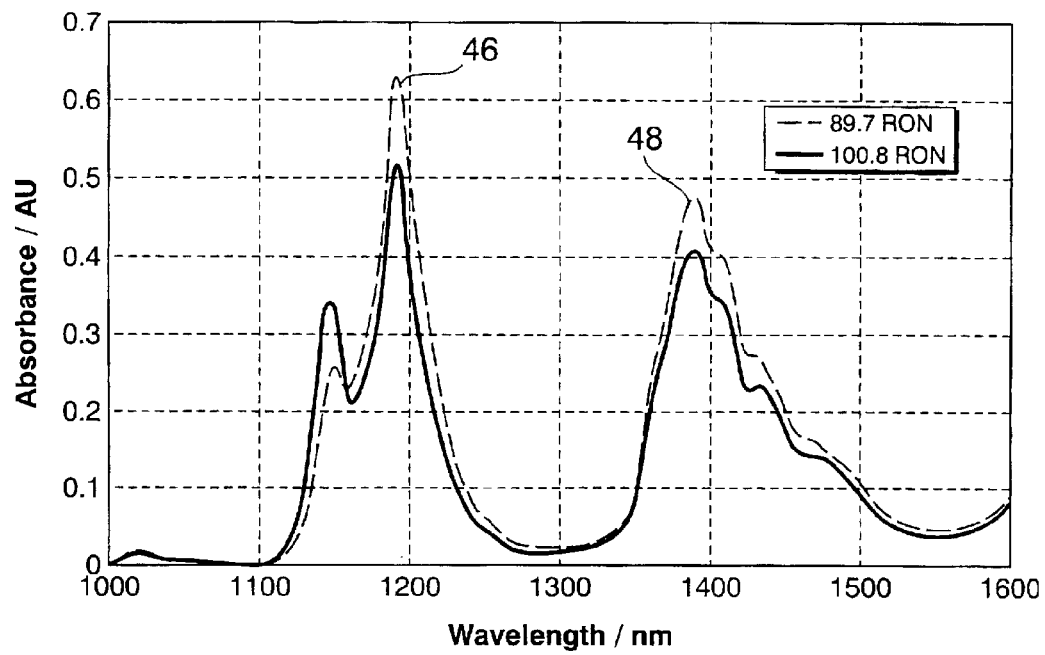
FIGS. 2 and 3 are graphical representations of measured data associated with variations in performance of a waste liquid cleansing membrane being monitored pursuant to the present invention.
Figure 3:
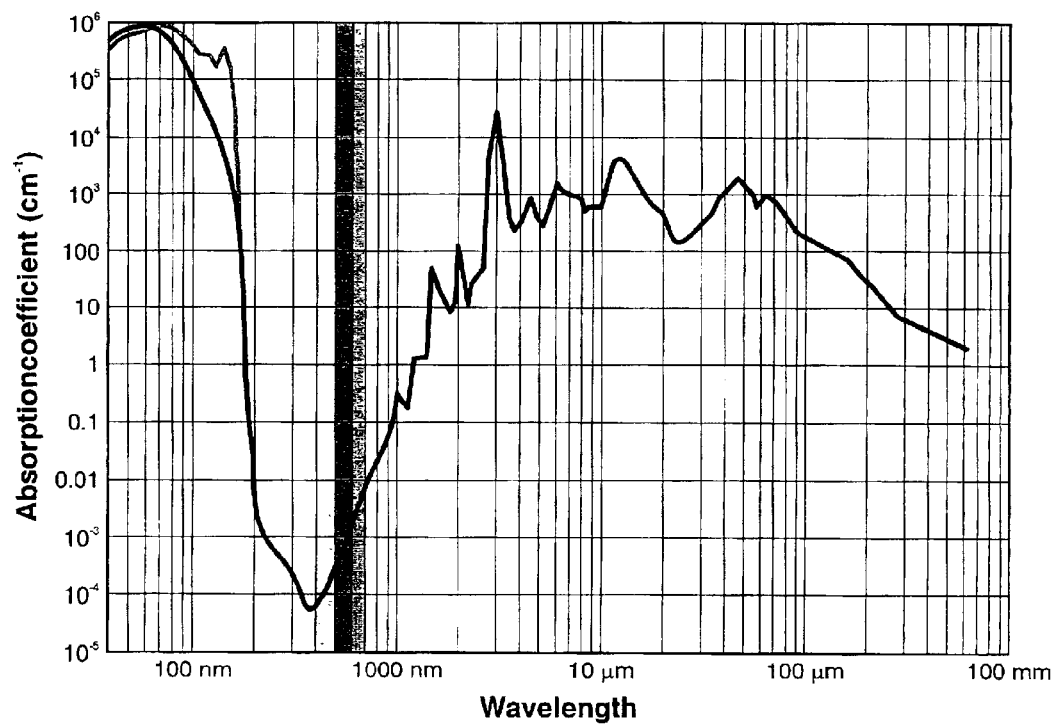

The sensor 24 thus generates a signal reflecting the amount of light energy absorbed by the oil from a body of air having a certain amount of light energy therein, to differentiate between a normal waste liquid permeate having no oil sheen and problematic permeate having an oil sheen. Such signal generated by the sensor 24 is transmitted to the analyzer 20 of a reflection spectrometer type. The signal changes so analyzed correspond to the amount of light energy absorbed at the water surface 44, which is considerably different for clean water as compared to water with a layer of oil thereon, since light is absorbed differently based on molecular interaction. Thus, the light energy detected by the sensor 24 will consist of wavelengths of light not absorbed at the water surface 44. Oils such as hydrocarbons found in the bilges of ships are therefore characterized by light detected by the sensor 24 within a wavelength range related to water surface absorption, as graphically depicted by the curve shown in FIG. 2, showing two distinct spike portions 46 and 48, respectively indicating light wavelengths of approximately 200 nanometers and 1400 nanometers. As graphically depicted in FIG. 3, water absorption of the light energy increases smoothly within a range between 1200 and 1400 nanometers so that the analyzer 20 may indicate the extent to which oil is present by its characteristic perturbations of absorbance. Thus, because of the signal data derived from the monitoring device 10, the analyzer 20 not only serves to provide real-time chemical information but also information regarding the spectral wavelength range of light from samples of the water conducted through the monitoring device 10 for exposure to a confined body of atmospheric air having light energy therein and subject to detection by the sensor 24 to provide signal data for analysis.

The same set-up arrangement of the monitoring device 10 may be utilized for monitoring membrane water permeate surfaces, acting as a prism having other illumination spectral wavelength ranges and no oil sheen thereon. Also, variations in oil layer thickness on the air gap exposed water surfaces, involving wavelength reinforcement or cancellation may be monitored in other embodiments of the present invention to produce color-patterned analyses associated for example with rain puddles surrounding an automobile that has an oil leak.

Obviously, other modifications and variations of the present invention may be possible in light of the foregoing teachings. It is therefore to be understood that within the scope of the appended claims the invention may be practiced otherwise than as specifically described.

What is claimed is:

1. In combination with a cleansing system for separation of waste from liquid thereby cleansed by passage through a membrane, a diverter valve, analyzer means connected to the diverter valve for control thereof to alternatively discharge the cleansed liquid therefrom or store the cleansed liquid for reprocessing by the cleansing system; and monitoring means through which the cleansed liquid is delivered to the diverter valve from the cleansing system for determining performance integrity of the membrane comprising: an enclosure through which flow of the cleansed liquid is conducted exclusively to the diverter valve; means sealingly confining a body of ambient atmospheric air having light energy therein within the enclosure for contact with a surface on the cleansed liquid during said flow thereof through the enclosure; and sensor means for optically detecting the light energy within said body of air in the enclosure after absorption by the cleansed liquid through said surface thereon to furnish signal data to the analyzer means from which the performance integrity of the membrane is determined.

2. The device as defined in claim 1, wherein said enclosure comprises: a tubular body having upper and lower end portions; and inflow tube means extending through said tubular body for establishing vertical flow passages therein between said end portions through which the cleansed liquid is conducted in opposite directions to and from said body of air at said upper end portion at which said exposure of the cleansed liquid occurs.

3. The device as defined in claim 2, wherein said cleansed liquid is oily waste water and the separated waste is oil.

4. The device as defined in claim 1, wherein said cleansed liquid is oily waste water and the separated waste is oil.

5. In combination with a cleaning system for cleansing of waste by separation from liquid during passage through a membrane and a diverter valve to which the cleansed liquid is delivered, a method for monitoring performance of the membrane by determining extent of membrane cleansing of the liquid before delivery to the diverter valve, comprising the steps of: conducting flow of the cleansed liquid through a body of atmospheric air already having light energy therein for contact with a surface of the cleansed liquid; and sensing the light energy remaining in said body of atmospheric air after absorption by the cleansed liquid at said surface, to provide signal data from which membrane performance may be determined.

6. The improvement as defined in claim 5, wherein the membrane performance is based on presence of a film of waste on the cleansed liquid at said surface thereon reflected by said absorption of the light energy.

7. The improvement as defined in claim 6, wherein the liquid is water and the waste is oil.

\* \* \* \* \*